US005613078A

United States Patent [19]
Kishigami

[11] Patent Number: 5,613,078
[45] Date of Patent: Mar. 18, 1997

[54] MICROPROCESSOR AND MICROPROCESSOR SYSTEM WITH CHANGEABLE EFFECTIVE BUS WIDTH

[75] Inventor: Hidechika Kishigami, Tokyo, Japan

[73] Assignee: Kabushiki Kaisha Toshiba, Kawasaki, Japan

[21] Appl. No.: 456,618

[22] Filed: Jun. 1, 1995

Related U.S. Application Data

[63] Continuation of Ser. No. 149,384, Nov. 9, 1993, abandoned.

[30] Foreign Application Priority Data

Nov. 9, 1992 [JP] Japan .................................. 4-298526

[51] Int. Cl.[6] .............................. G06F 13/40; G06F 9/34
[52] U.S. Cl. .......................... 395/306; 395/309; 395/800; 364/DIG. 1
[58] Field of Search .................................. 395/306, 309, 395/375, 800

[56] References Cited

U.S. PATENT DOCUMENTS

| | | | |
|---|---|---|---|
| 4,633,437 | 12/1986 | Mothersole et al. | 395/250 |
| 5,113,369 | 5/1992 | Kinoshita | 395/307 |
| 5,125,084 | 6/1992 | Begun et al. | 395/375 |
| 5,191,653 | 3/1993 | Banks et al. | 395/293 |
| 5,220,651 | 6/1993 | Larson | 395/250 |
| 5,280,598 | 1/1994 | Osaki et al. | 395/307 |
| 5,300,811 | 4/1994 | Suzuki et al. | 257/691 |

FOREIGN PATENT DOCUMENTS

| | | |
|---|---|---|
| 0036185 | 9/1981 | European Pat. Off. . |
| 0417707 | 3/1991 | European Pat. Off. . |
| 3-98145 | 4/1991 | Japan . |

OTHER PUBLICATIONS

Electronic Design, vol. 33, No. 12, pp. 219–225, May, 1985, C.K. Zoch, et al., "68020 Dynamically Adjusts its Data Transfers to Match Peripheral Ports".

Primary Examiner—Parshotam S. Lall
Assistant Examiner—Viet Vu
Attorney, Agent, or Firm—Oblon, Spivak, McClelland, Maier & Neustadt, P.C.

[57] ABSTRACT

A microprocessor having a data-width change function has a core section in the microprocessor for fetching an instruction from the external memories in instruction fetch request, transferring data between the external memories and the microprocessor in data access request, and executing the instruction fetched and processing operand access operation, internal buses connected to the core section for transferring data to the core section, a memory for storing first bus indication data and second bus-width indication data indicating a bus-width of specified external buses, a bus-width change circuit connected to the internal buses and the external buses for changing specified external buses in the external buses to connect specified buses in the internal buses to be used during the instruction fetch bus cycle and the data access bus cycle, and a bus-width change controller connected to the bus change circuit and the memory for changing the bus-width of the buses in the external data buses based on the first bus-width indication data stored in the memory at the instruction fetch operation, and the second bus-width indication data stored in the memory, in order to transfer data with specified bus-width of the external data buses.

5 Claims, 14 Drawing Sheets

St 1; St 1·IBBS+St2·$\overline{DC}$·B32+(St4+S10)·$\overline{DC}$
St 2; St 1·$\overline{IBBS}$+St2·DC
St 3; St 2·$\overline{DC}$·B16
St 4; St 3+St4·DC
St 5; St 2·$\overline{DC}$·B8
St 6; St5+St6·DC
St 7; St6·$\overline{DC}$
St 8; St 7+St8·DC
St 9; St8·$\overline{DC}$
St10; St9+St10·DC

SELECTOR 13

SELECTOR 14

SELECTOR 15

SELECTOR 16

MICROPROCESSOR AND MICROPROCESSOR SYSTEM WITH CHANGEABLE EFFECTIVE BUS WIDTH

This application is a continuation of application Ser. No. 08/149,384, filed on Nov. 9, 1993, now abandoned.

TECHNICAL FIELD

The present invention relates to a microprocessor which is capable of changing or adjusting a data-width according to a data-width of external memories to be accessed during memory access operation.

BACKGROUND ART

It is required to adjust a data-width difference between a microprocessor and external memories when a microcomputer system is designed.

We will explain below a conventional data-width adjustment technique which is commonly used in a conventional microprocessor system and a problem included in this conventional technique.

For example, a conventional microprocessor system consists of a microprocessor having 32 bit bus-width, a ROM of 8 bit bus-width for storing a program including instructions, and 4 RAMs, each having 8 bit bus-width, for temporarily storing data.

If the microprocessor has no function for adjusting data-width, as shown in FIG. 1, in order to overcome such drawback there is a conventional method to adjust data-width difference in which the 32 bit data bus 102 of MPU 101 is connected with a 8 bit ROM 103 through a bus-width conversion circuit 104. We will explain below this method and this technique and a problem included in this conventional method.

As shown in FIG. 2, when a microprocessor system does not include the bus-width conversion circuit 104 shown in FIG. 1, there is a method for adjusting the bus-width difference in which the total number of bit-width of ROMs 103 is 32 bits because the total number of the ROMs 103 is four (8 bits×4=32 bits). Thus, the 32 bit data bus 102 may be connected directly to the ROMs 102 in the microprocessor system.

In the conventional method shown in FIG. 1, it must be required to add the bus-width conversion circuit 104 in the microprocessor system, on the other hand, the conventional method shown in FIG. 2, the extra three ROMs are further required to the microprocessor system in addition to the ROM 103 in the conventional method shown in FIG. 1. Therefore the configuration of the microprocessor system becomes larger and the cost of the microprocessor system increases.

On the other hand, there is a conventional microprocessor which is capable of fixedly changing the data-width of a data bus based on external signals. In a microprocessor system including such the microprocessor, as shown in FIG. 3, according to the external signal such as 8 bit bus-width indication signal the bus-width of the data bus 105 is set in 8 bits, then four RAMs 106 are connected in parallel to the data bus 105.

However, although the microcomputer system uses these four RAMs 106, the data-width of the ROMs 106 becomes 8 bits in the conventional method described above. In this case, when comparing with the configurations of the microprocessor systems shown in FIGS. 1 and 2, the bit-width of data is decreased, so that the operational performance of the microprocessor system is decreased because the processing function thereof is decreased.

There is a microprocessor having a configuration to overcome the problems described above. This function of the microprocessor is called as "dynamic bus sizing function". In the dynamic bus sizing function, the microprocessor inputs bus-width indication signals per bus cycle in order to repeatedly perform a bus cycle operation for requiring. This function is introduced in many kinds of conventional microprocessors, for example MC68020 manufactured by MOTOROLA corporation.

In this dynamic bus sizing function, the bit-width of external memories to be accessed in each bus cycle is recognized because it must be required to input the bus-width indication signals per bus cycle. For this reason, as shown in FIG. 4, a microprocessor system including a MPU 107 having the dynamic bus sizing function must have a circuit 109 which is generates a bus-width indication signal corresponding to a data-width of an external memory which is recognized for accessing after decoding an address signal transferred to an address bus 108 in the MPU 107.

In the microprocessor system, the bus-width indication signals generated from this circuit 109 is transferred to MPU 107 per bus cycle.

However, in the microprocessor system including the microprocessor 107 having the dynamic bus sizing function, as shown in FIG. 5, the bus-width indication signals are generated by an address driver 112 for transferring address signals output from the MPU 110 to a memory 111, an address decoder 113 for decoding the output from the address driver 112 and then generates a selection signal CS for selecting the memory 111 to be accessed, and a bus-width indication signal generator 114 for generating bus-width indication signals corresponding to the bit-width of the memory to be selected by the selection signal from the address decoder 112.

As shown in a timing chart in FIG. 6, a set-up time to define the following equation.

$$t_{cyc} - (t_a + t_b + t_c + t_d) > t_e$$

wherein "$t_{cyc}$" is an allowable bus cycle time to access the memory 111, "$t_a$" is a delay time of address signal output from the MPU 110 in synchronization with a clock signal, "$t_b$" is a delay time of an address signal by the address driver 112, "$t_c$" is a delay time of the address decoder 113, "$t_d$" is a time to be required for generating signals by the generator 114, and "$t_e$" is a setting up timing of the bus-width indication signal.

Accordingly, as clearly shown in the above equation, the setting-up timing for the bus-width indication signal becomes strict and accessing timing for the memory becomes also rigid when the operational frequency such as the clock signal becomes high in order to reduce the bus cycle time. It causes error operation in the microprocessor system. In addition, in a case where it is required to further reduce the bus cycle time, a high speed operation of the microprocessor system cannot be achieved because the output condition of the bus-width indication signals is not satisfied.

In addition, the microprocessor having a function similar to the dynamic bus sizing function described above is disclosed in the Japanese Patent laid open No.3-98145.

This microprocessor is capable of dynamically changing a bus-width corresponding to the address of a region to be accessed. In this microprocessor signal indicatings a bus-width are generated based on an address decoding result like the microprocessor having the dynamic bus sizing function because a bus-width indication signals is generated after comparing the decoding result of an address signal with a specified address.

Accordingly the same problem is also caused when the microprocessor system in which the decoding operation and the comparing operation are executed because it takes much time to generate bus-width indication signals.

As described above, inconveniences are introduced by using the conventional method for adjusting data-width in a microprocessor system which consists of a microprocessor and external memories which have different data-widths.

Accordingly, this causes memory using efficiency to decrease and the specific configuration to add, so that the configuration and the cost of the microprocessor system become increasing.

When a microprocessor system is constructed by using a microprocessor which is capable of changing temporarily and fixedly a bus-width according to an external signal, a processing function of the microprocessor system is decreased because external memories in the system are not used efficiency. This is also a problem.

On the other hand, when a microprocessor system is constructed by using a microprocessor having the dynamic bus sizing function or a function similar to the dynamic bus sizing function, operational timing of the system is strict, so that a high speed operation becomes difficult. This is also a problem.

SUMMARY OF THE INVENTION

The main object of the present invention is to provide a microprocessor which is capable of performing at a high speed rate and adjusting data-width without decreasing processing ability and increasing of a system costs thereof and to avoid decreasing of the margin of operations caused by increasing of an operational frequency thereof.

According to an aspect of the present invention, there is provided a microprocessor having a data-width changing function which accesses instruction and data to external memory means through external data bus means consisting of a plurality of buses which is connected to said microprocessor, which comprising:

processor core means formed in said microprocessor for fetching an instruction from said external memory means in instruction fetch request operation, transferring data between said external memory means and said microprocessor in data access request operation, and executing the instruction fetched and processing operand access operation;

internal bus means having a plurality of buses connected to said processor core means for transferring data to said processor core means;

memory means for storing first bus indication data indicating the bus-width of specified buses used in said external bus means during instruction fetch bus cycle operation for fetching an instruction and second bus-width indication data indicating a bus-width of specified buses used in said external bus means during data access bus cycle operation;

bus-width change means connected to said internal bus means and said external bus means for changing specified buses in said external bus means to connect specified buses in said internal bus means to be used during the instruction fetch bus cycle and the data access bus cycle operations; and bus-width change control means connected to said bus-width change means for changing the bus-width of the buses in said external data bus means based on the first bus-width indication data stored in said memory means at the instruction fetch operation, and based on the second bus-width indication data stored in said memory means at the data access operation, in order to transfer data with specified bus-width of said external data bus means.

In the microprocessor described above as another aspect of the present invention, the content of said memory means is re-set by said processor core means based on a program.

In the microprocessor described above as another aspect of the present invention the content of said memory means is set with fixed data when said microprocessor is initialized.

In the microprocessor described above as another aspect of the present invention, the content of said memory means may be re-set after initialization for said microprocessor.

In the microprocessor described above as another aspect of the present invention, said microprocessor further comprises selection means for selecting the first and second bus-width indication data which is provided from external device of said microprocessor when a re-setting signal is effective, and selecting the first and second bus-width indication data which is transferred from said processor core means, then said microprocessor stores the first and second bus-width indication data selected by said selection means to said memory means as an initial value.

According to another aspect of the present invention, there is provided a microprocessor having a data-width change function which accesses instruction and data to external memory means through external data bus means consisting of a plurality of buses which is connected to said microprocessor, which comprising:

processor core means formed in said microprocessor for fetching an instruction from said external memory means in instruction fetch request operation, transferring data between said external memory means and said microprocessor in data access request operation, and executing the instruction fetched and processing operand access operation;

internal bus means having a plurality of buses connected to said processor core means for transferring data to said processor core means;

bus-width change means connected to said internal bus means and said external bus means for changing specified buses in said external bus means to connect specified buses in said internal bus means to be used during the instruction fetch bus cycle and the data access bus cycle operations; and bus-width change control means connected to said bus change means for changing the bus-width of the buses in said external data bus means based on the first bus-width indication data provided from external device of said microprocessor at the instruction fetch operation.

and based on the second bus-width indication data provided from external device of said microprocessor at the data access operation, in order to transfer data with specified bus-width of said external data bus means.

BRIEF DESCRIPTION OF THE DRAWINGS

These and other objects, features and advantages of the invention will be apparent from the following detailed description of a preferred embodiment of the present invention as illustrated in the accompanying drawings of which.

DETAILED DESCRIPTION OF THE PREFERRED EMBODIMENTS

Other features of this invention will become apparent in the course of the following description of exemplary embodiments which are given for illustration of the invention and are not intended to be limiting thereof.

We will be describing below a microprocessor having a bus-width adjusting function as preferred embodiments of the present invention.

Figure 1:
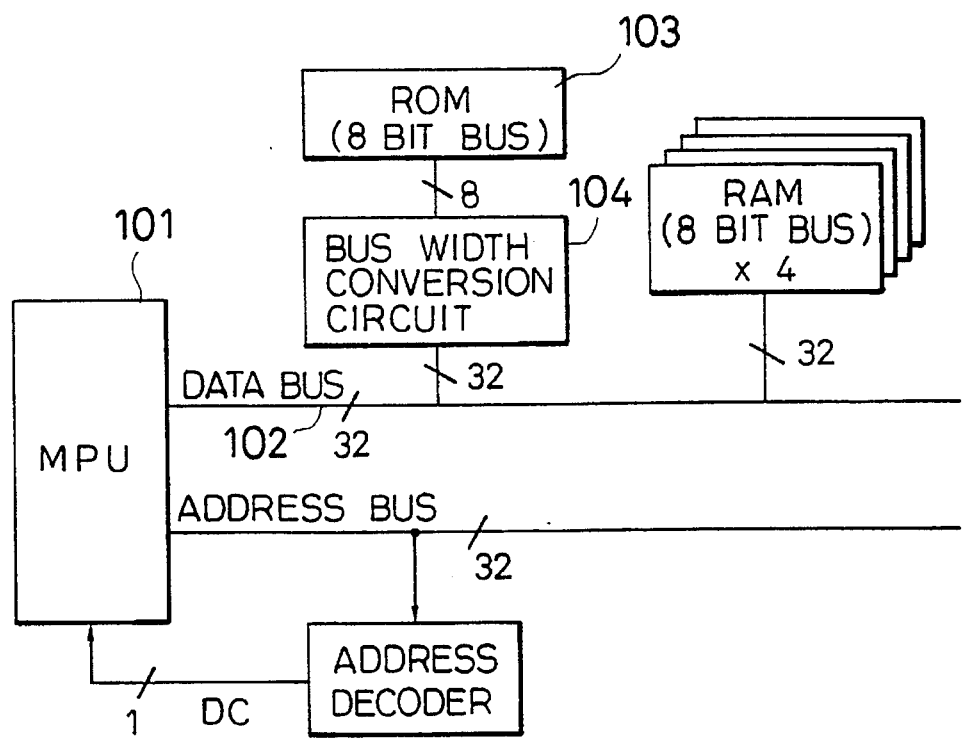
FIG. 1 is a configuration of a conventional microprocessor system in which data-widths of the microprocessor system and external read only memory (ROM) is different.
Figure 2:
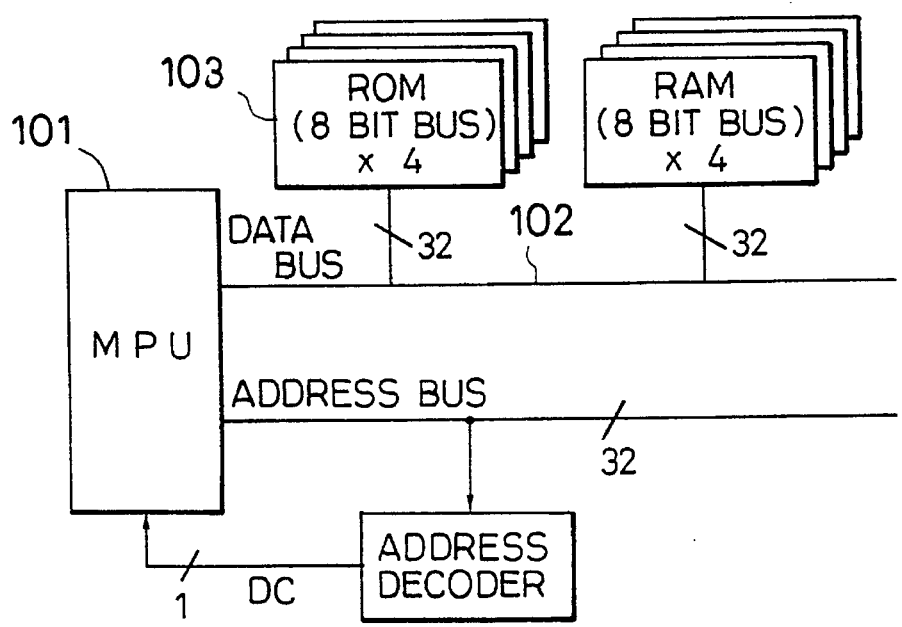
FIG. 2 is another configuration of a conventional microprocessor system in which data-width of the microprocessor system and external ROM is different.
Figure 3:
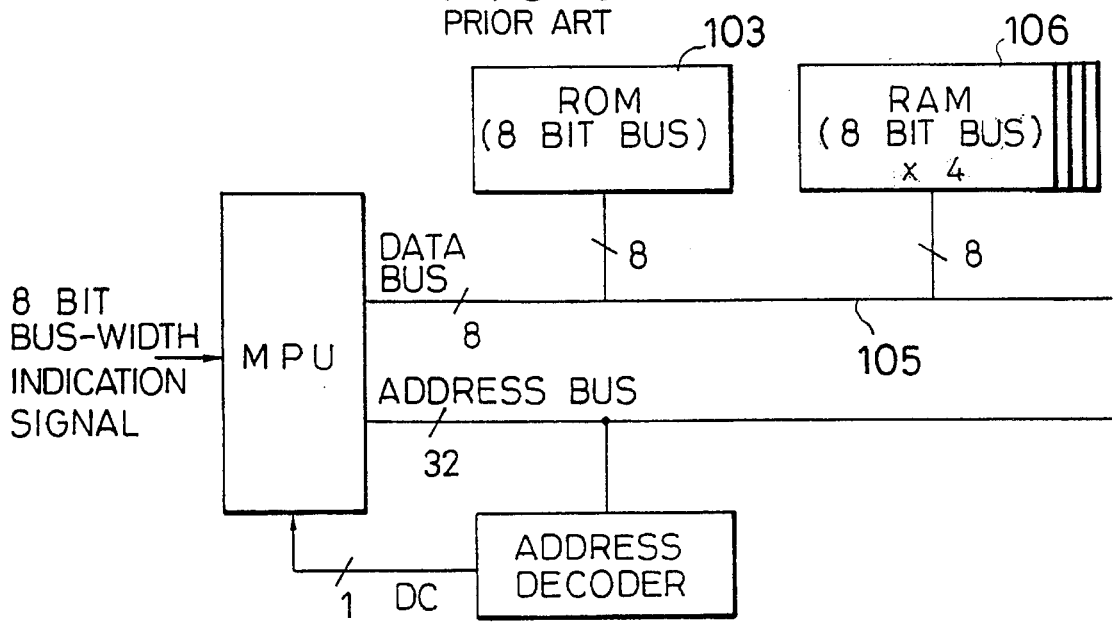
FIG. 3 is another configuration of a conventional microprocessor system in which data-width of the microprocessor system and external memories are different.
Figure 4:
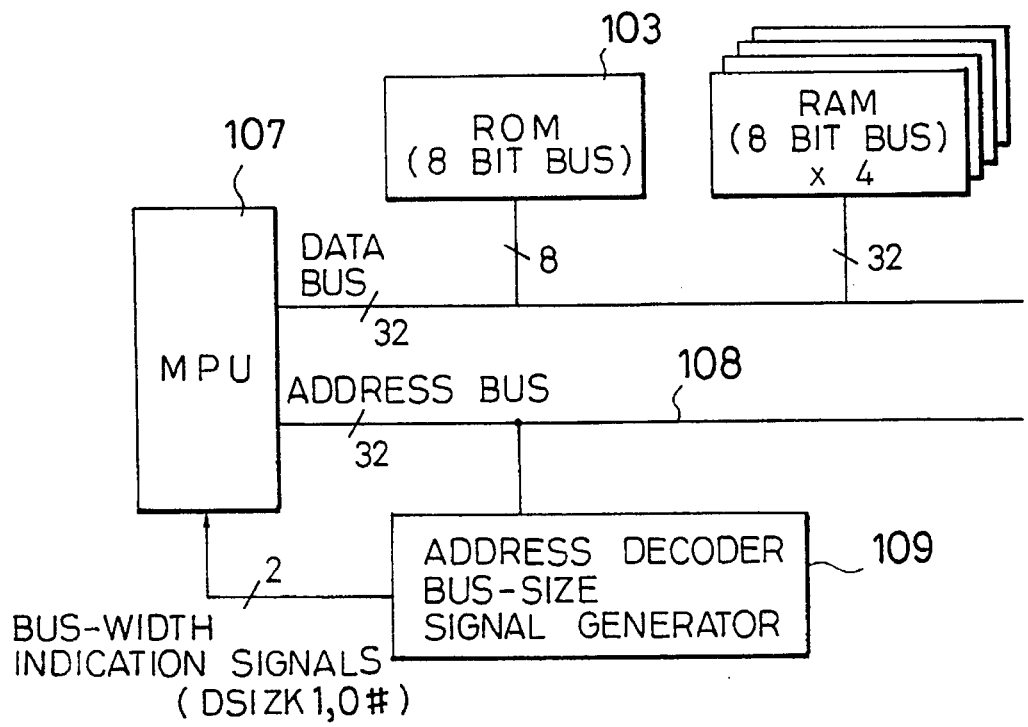
FIG. 4 is another configuration of a conventional microprocessor system in which data-widths of the microprocessor system and external memories are different.
Figure 5:
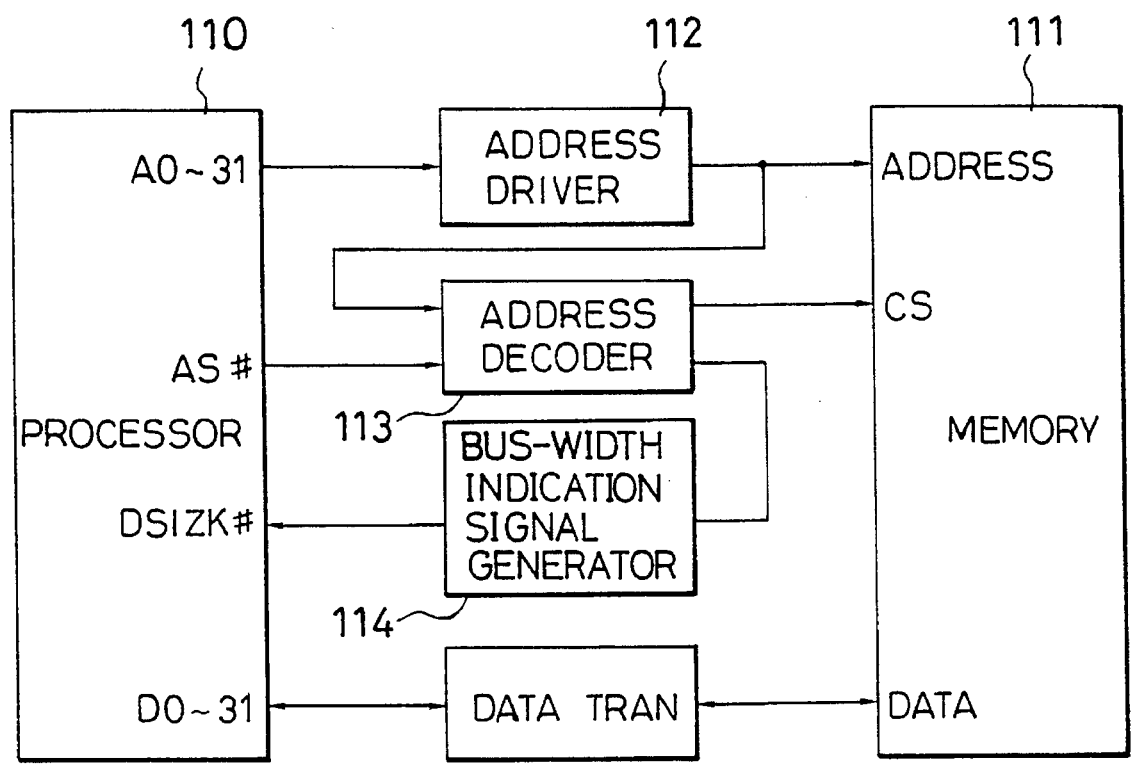
FIG. 5 is a configuration of a conventional microprocessor system showing a conventional dynamic bus sizing function.
Figure 6:
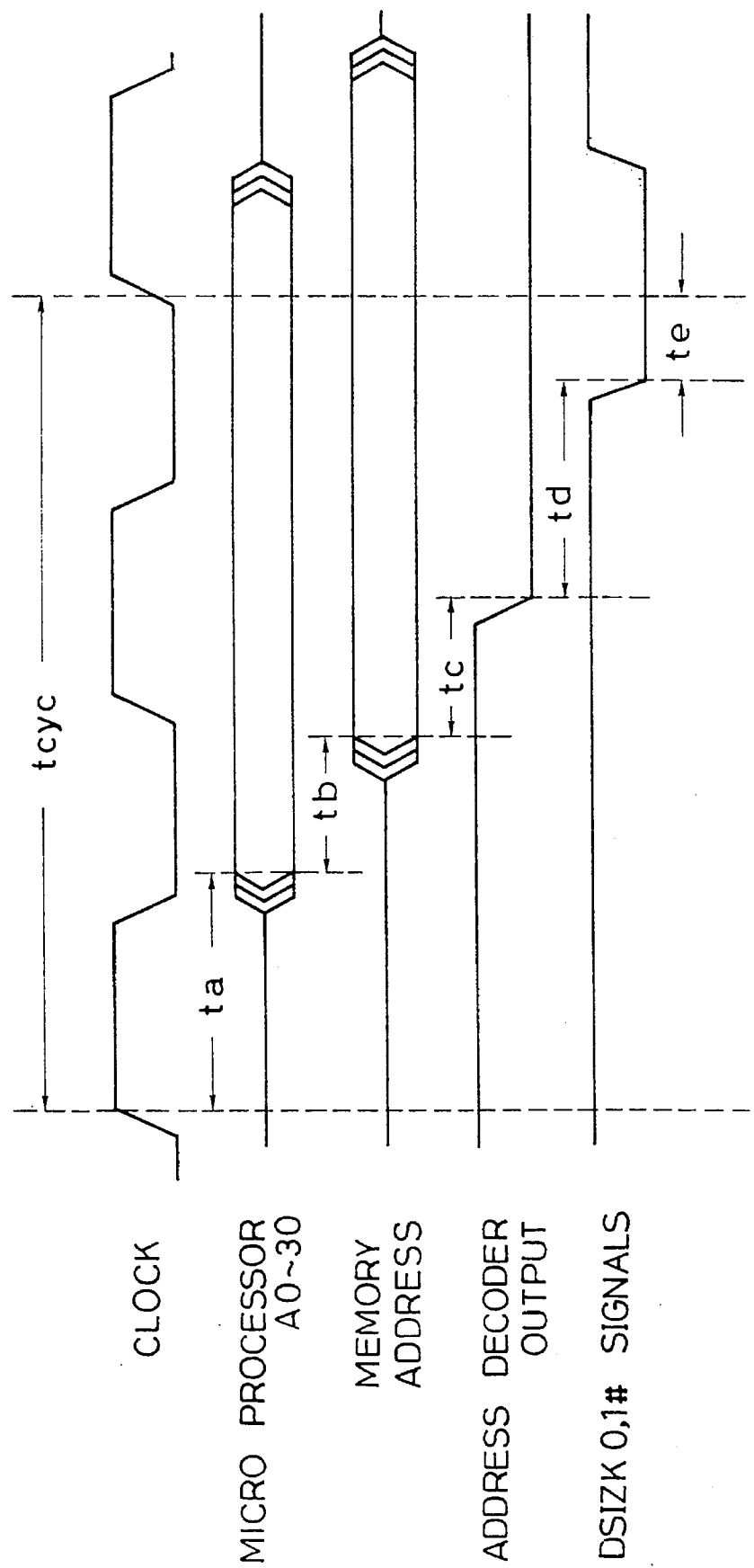
FIG. 6 is a timing chart of the microprocessor system shown in FIG. 5.
Figure 7:
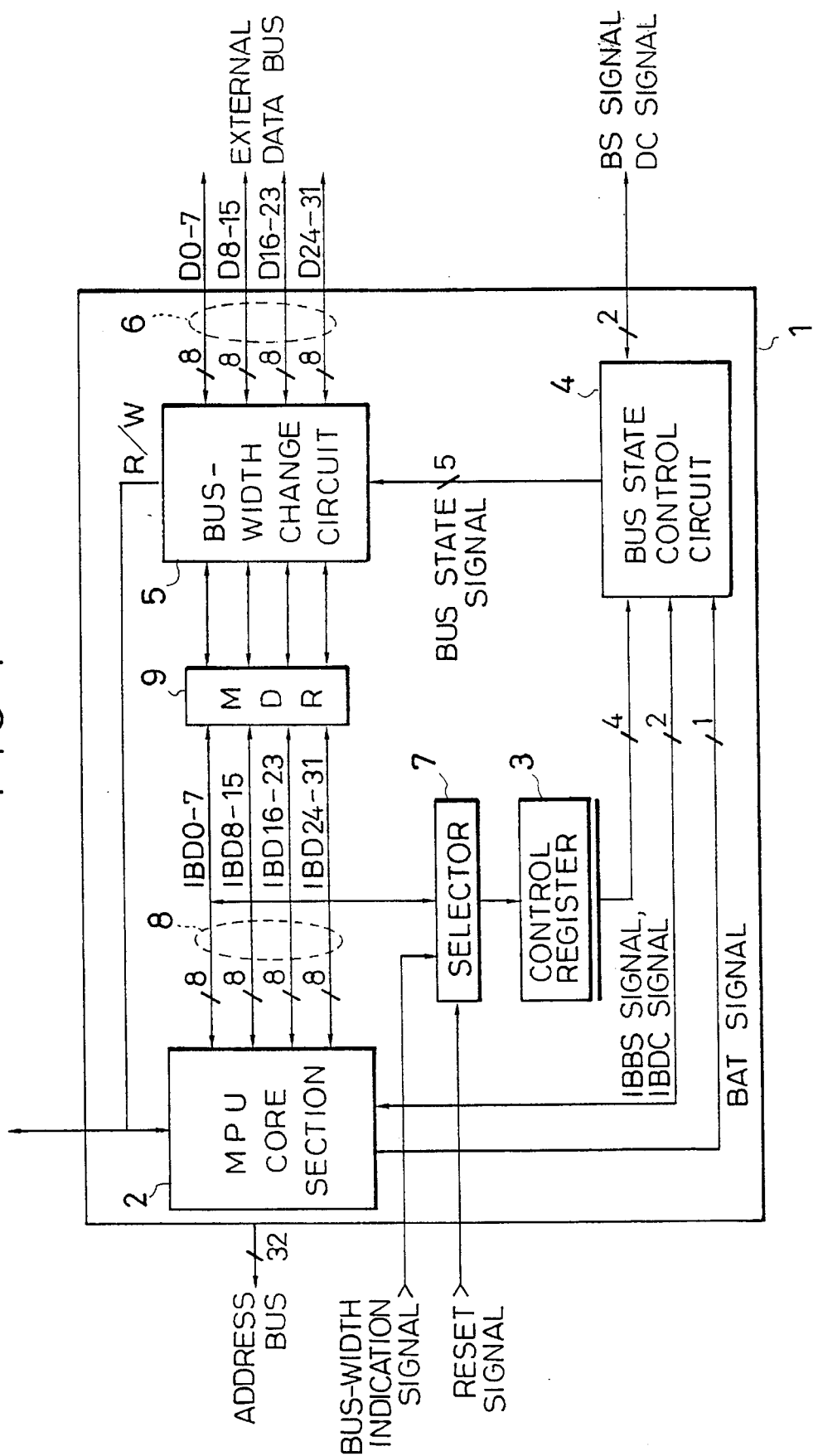
FIG. 7 is a configuration of a microprocessor as a first embodiment according to the present invention.

FIG. 7 is a block diagram of a microprocessor as a first embodiment of the present invention.

The microprocessor is capable of selecting a bus-width at an instruction fetch operation and an operand access operation each according to a specified bus-width which has already stored in an internal register.

In FIG. 7, a 32 bit microprocessor or MPU 1 comprises a MPU core section 2 which has a main function of the MPU 1, a control register 3 to store information designating a bus-width, a bus state control circuit 4, an external data bus (D0 to D31), an internal data bus (IB0 to IB31), and a bus-width change circuit 5 for performing under the control of the bus state control circuit 4.

Figure 8:
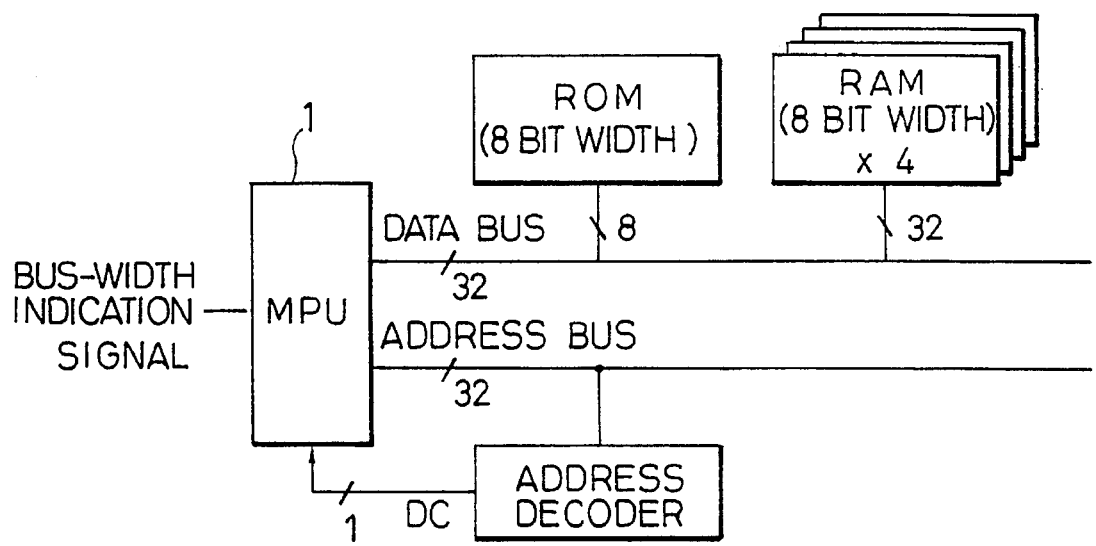
FIG. 8 is a configuration of a microprocessor system incorporating the microprocessor shown in FIG. 7.
Figure 9:
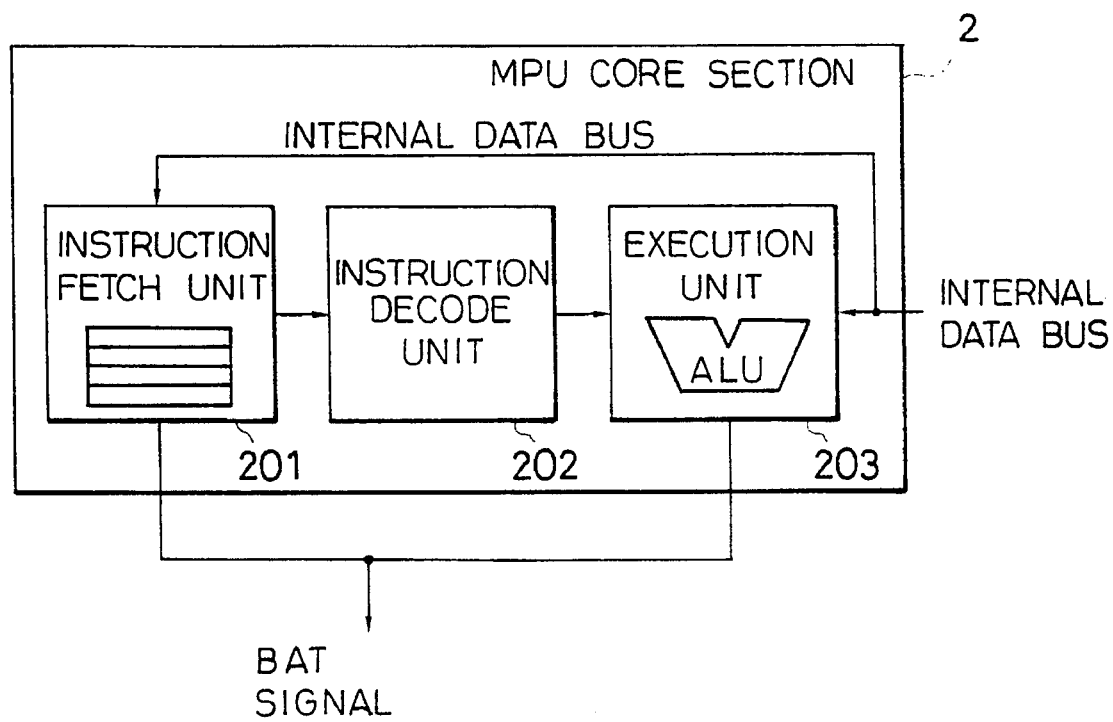
FIG. 9 is a configuration of a processor core section of the microprocessor shown in FIG. 7.

As shown in FIG. 8, for example, a microprocessor system is formed by using the microprocessor 1 above, a ROM of 8 bit bus-width for storing a program, and four RAMs for temporarily storing data.

The MPU core section 2 can treat address and data of 32 bit-width. The MPU core section 2 consists of instruction fetch unit 201, an instruction decode unit 202, and an execution unit 203.

The instruction fetch unit 201 outputs a bus access type signal BAT of 1 (BAT=1) that indicates instruction fetch operation to the external ROM. Likewise, the execution unit 203 outputs the bus access type signal BAT of 0 (BAT=0) to indicate operand access operation to the external RAMs in an instruction execution operation.

Figure 10:
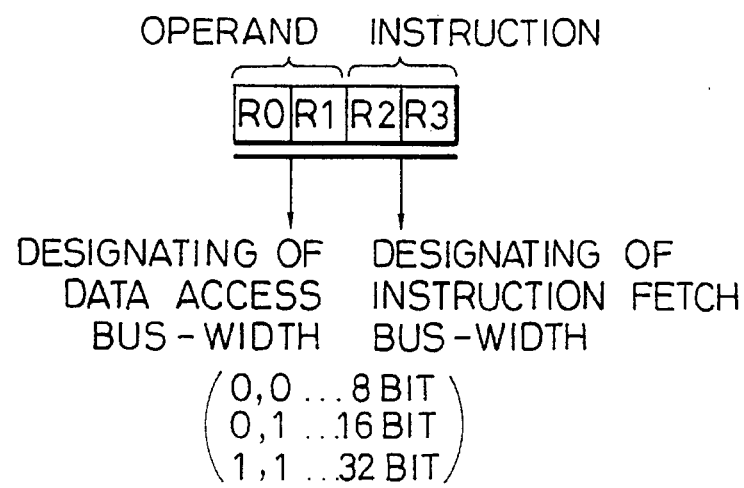
FIG. 10 is a configuration of a control register in the microprocessor shown in FIG. 7.
Figure 11:
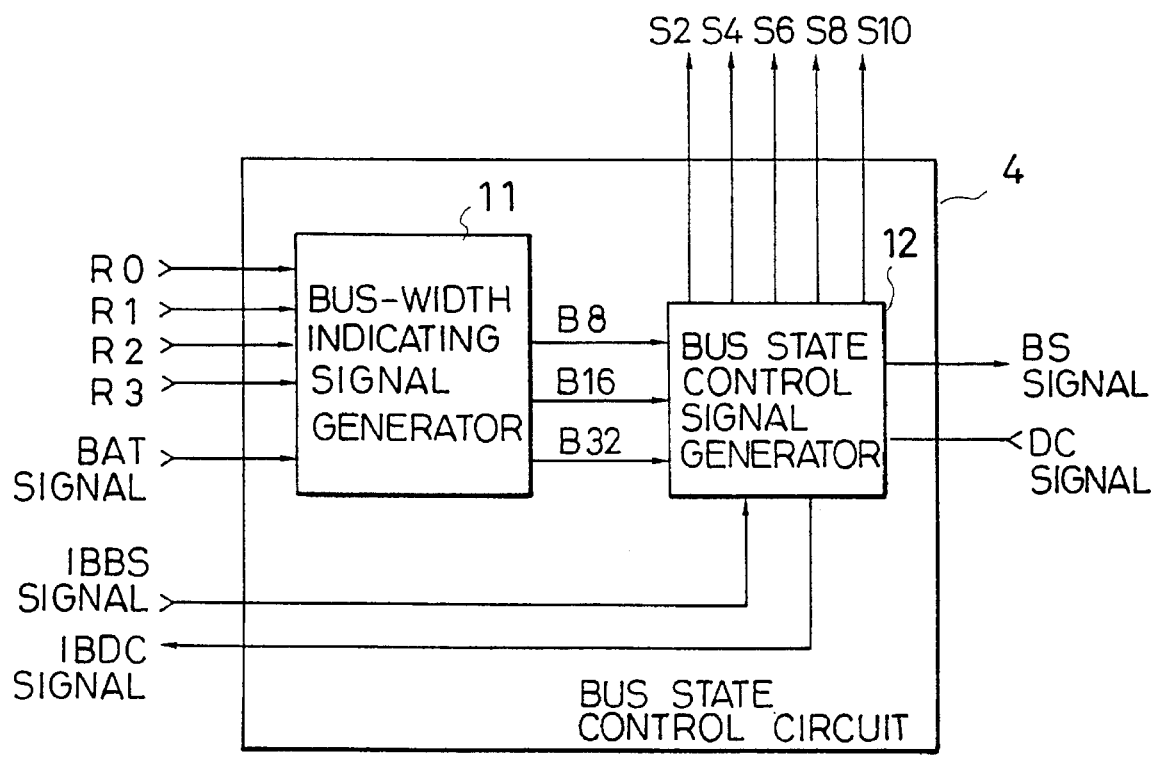
FIG. 11 is a configuration of a bus state control circuit in the microprocessor shown in FIG. 7.

The control register 3 stores data that indicates a bus-width of the external data bus 6 to actually use for data transfer operation. For example, the configuration of the control register 3 is made up of 4 bit fields, as shown in FIG. 10. The fields R0 and R1 are used for indicating a bus-width of the external data bus 6 during the operand access operation. One of 8 bit bus-width, the 16 bit bus-width, and 32 bit bus-width is selected based on the contents of the fields R0 and R1.

On the other hand, the fields R2 and R3 are used for indicating a bus-width of the external data bus 6 during the instruction fetch operation. One of 8 bit bus-width, the 16 bit bus-width, and 32 bit bus-width is also selected based on the contents of the fields R2 and R3.

A bus-width indication data is input to the control register 3 from external bus-width indication signal when a reset signal for initializing the microprocessor 1 is asserted. On the other hand, through a selector 7 during a normal operation of the microprocessor 1, the bus-width indication data is input to the control register 3 from the MPU core section 2 through the selector 7.

Thus, an actual bus-width of the external data bus 6 to be accessed is set as an initial value from the bus-width indication signal when the microprocessor 1 is initialized, then during normal operation the content of the control register 3 may be changed by a software program as required.

The bus state control circuit 4, consists of a bus-width indication signal generator 11 and a bus state control signal generator 12. The bus-width indication signal generator 11 generates a bus-width indication signal B8, B16, and B32 based on the contents of the control register 3 (R0 to R3) and the bus access type signal BAT.

The bus state control signal generator 12 generates control signals S2, S4, S6, S8, and S10 for controlling the bus-width change circuit 5, an internal bus cycle completion signal IBDC for indicating the completion of the bus cycle, and an external bus cycle start signal BS for indicating the start of the bus cycle.

Figure 12:
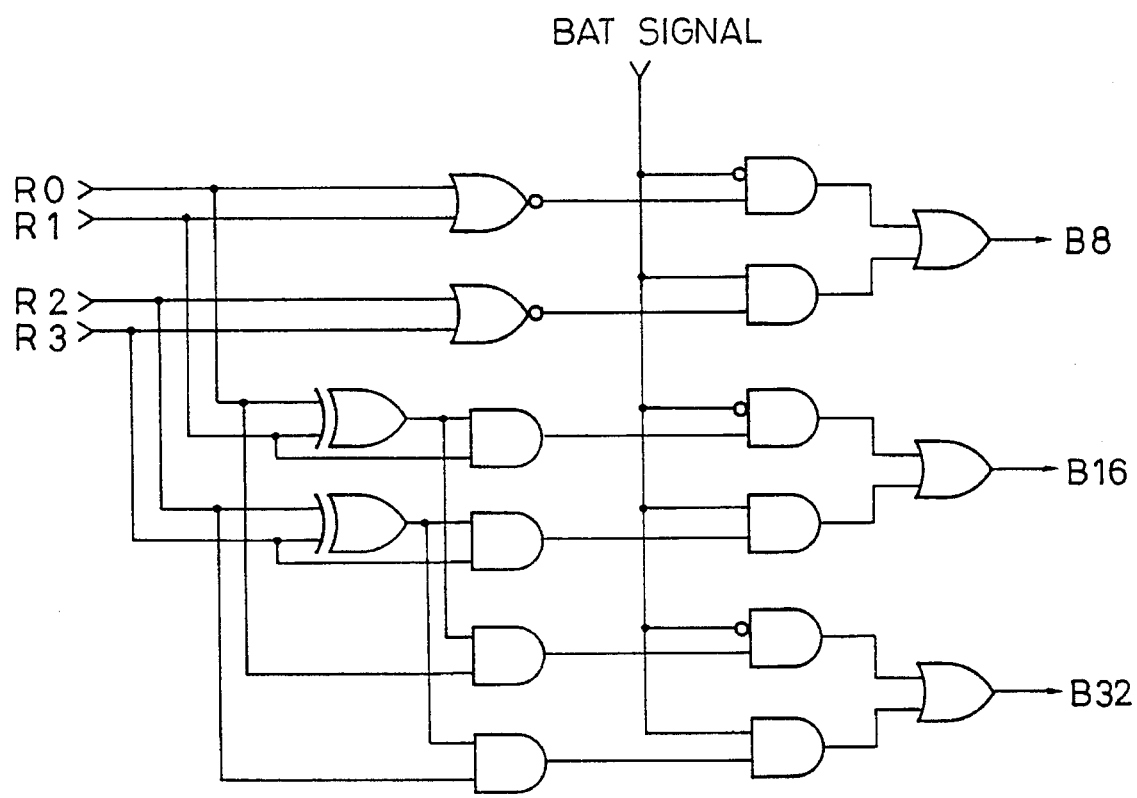
FIG. 12 is a configuration of a bus-width indication signal generator in the bus state control circuit shown in FIG. 11.

The bus-width indication signal generator 11, for example as shown in FIG. 12, consists of logical gates which have the following logic relationship shown in Table 1.

TABLE 1

| BAT | R0 | R1 | R2 | R3 | B8 | B16 | B32 |
|---|---|---|---|---|---|---|---|
| 0 | 0 | 0 | * | * | 1 | 0 | 0 |
| 0 | 0 | 1 | * | * | 0 | 1 | 0 |
| 0 | 1 | 0 | * | * | 0 | 0 | 1 |
| 0 | 1 | 1 | * | * | 0 | 0 | 0 |
| 1 | * | * | 0 | 0 | 1 | 0 | 0 |
| 1 | * | * | 0 | 1 | 0 | 1 | 0 |
| 1 | * | * | 1 | 0 | 0 | 0 | 1 |
| 1 | * | * | 1 | 1 | 0 | 0 | 0 |

"*": Don't care

In a case where the BAT signal designates the operand access operation (BAT=0), the bus-width of the external data bus 6 is selected as follows:

When the contents of R0 and R1 are all "0", the bus-width of the external data bus 6 becomes 8 bit bus-width and the bus-width change signal B8 becomes "1".

When the contents of R0 and R1 are "0,1", the bus-width of the external data bus 6 becomes the 16 bit bus-width and the bus-width change signal B16 is "1".

When the contents of R0 and R1 are "1,0", the bus-width of the external data bus becomes the 32 bit bus-width and the bus-width change signal B32 is "1".

On the other hand, in a case where the BAT signal designates the instruction fetch operation (BAT=1), the bus-width of the external data bus 6 is selected as follows:

When the contents of R0 and R1 are all "0", the bus-width of the external data bus 6 becomes 8 bit bus-width and the bus-width change signal B8 becomes "1".

When the contents of R0 and R1 are "0,1", the bus-width of the external data bus 6 becomes the 16 bit bus-width and the bus-width change signal B16 is "1".

When the contents of R0 and R1 are "1,0", the bus-width of the external data bus becomes the 32 bit bus-width and the bus-width change signal B32 is "1".

Figure 13:
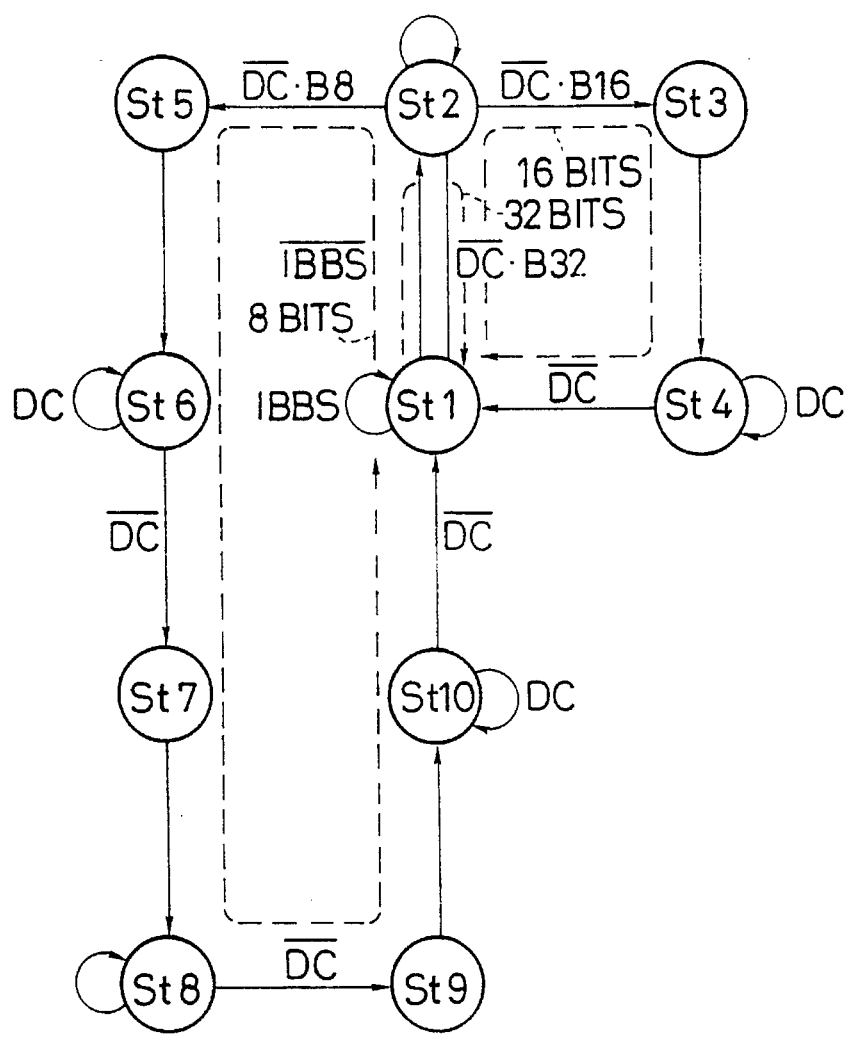
FIG. 13 is a state transition diagram of the bus state control circuit shown in FIG. 11.

The bus state control signal generator 12, generates control signals S2, S4, S6, S8, and S10 in order to control the bus-width change operation for the bus-width change circuit 5 as shown in a state transition diagram in FIG. 13.

In the state transition diagram shown in FIG. 13, each state transits in synchronism with a rising edge of the clock signal. A state St1 means a state in which no bus cycle is performed. The states St2, St4, St6, St8, and St10 indicate a waiting state in which the current state is kept as long as the external data transfer completion signal (DC) is asserted.

In the state transition diagram of FIG. 13, if the bus-width of the external data bus 6 is set as the 32 bit bus-width when the bus cycle starts at the state St1, then the state St1 transits to the state St2 at the first clock, and the state St2 transits to the state St1 at the second clock if the data transfer completion signal DC is asserted as the low level. If the DC is not asserted, then the state St2 transits to itself repeatedly till the DC is asserted at the state. In this case, 32 bit data is transferred at the timing of the state transition St2 to St1.

In a case where the bus-width of the external data bus is set as 16 bit data-width when the bus cycle operation starts at the state St1, then the state St1 transits to the state St2 at the first clock, the state St2 transits to the state St3 at the second clock if the DC is asserted, the state St8 transits to the state St4 at the third clock, and the state St4 transits to the state St1 at the fourth clock if the DC is asserted. If the DC is not asserted at the state St2 or St4, then the state transits to itself repeatedly till the DC is asserted at the state.

In this case, each 16 bit data is transferred at the timing of state transition St2 to St3 and St4 to St1. Thereby the entire 32 bit data is transferred completely by 16 bit data each in two external bus cycles.

In a case where the bus-width of the external data bus is set as 8 bit data-width when the bus cycle operation starts at the state St1, then the state transition is St1->St2->St5->St6->St7->St8->St9->St10->St1.

If the DC is not asserted at the state St2, St6, St8, or St10, then the state transition to itself repeatedly till the DC is asserted at the state. In this case, each 8 bit data is transferred at the timing of state transition St2 to St5, St6 to St7, St8 to St9, and st10 to St1. Thereby the entire 32 bit data is transferred completely by 8 bit data each in four external bus cycles.

Figure 14:
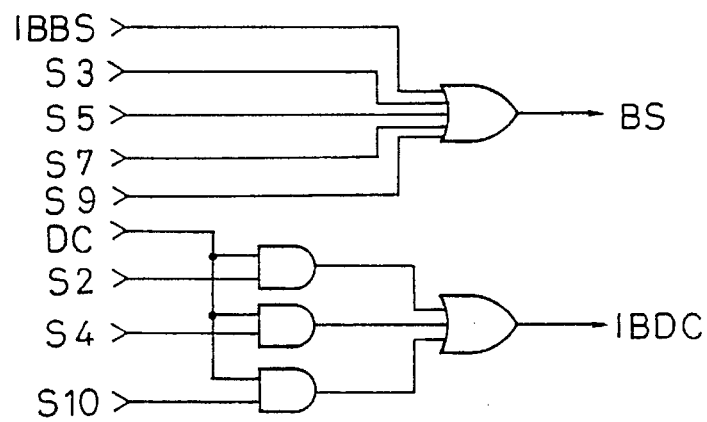
FIG. 14 is a part of the configuration of the bus state control signal generator in the bus state control circuit shown in FIG. 11.

In the bus state control signal generator 12, the external bus cycle start signal (BS) and the internal bus data transfer completion signal (IBDC) are generated by the logic gates as shown in FIG. 14.

Figure 15:
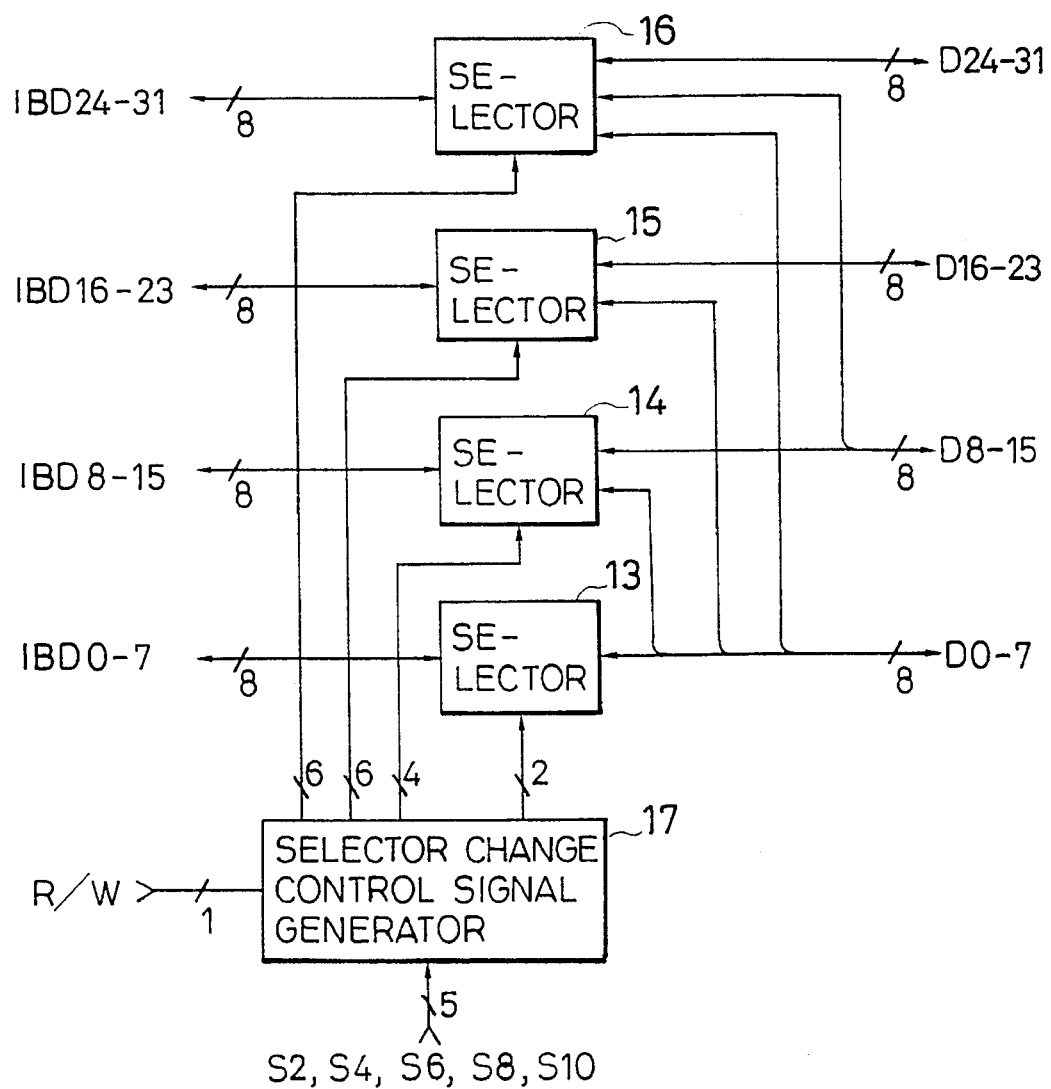
FIG. 15 is a configuration of a bus change circuit in the microprocessor show in FIG. 7.

As shown in FIG. 15, the bus-width change circuit 5 consists of selectors 13 to 16 and a selector change control signal generator 17. The bus-width change circuit 5 is connected to the internal data bus 8 through a memory data register (MDR) 9.

By the selectors 13 to 16 the internal data bus 8 is connected to the external data bus 6 every 8 bits. The selectors 13 to 16 has a configuration shown in FIGS. 16 to 19, for example.

Figure 16:
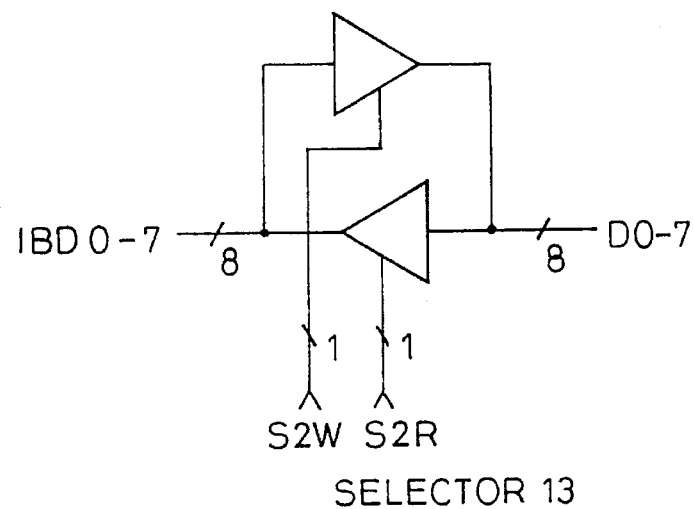
FIG. 16 is a configuration of the selector 13 in the bus change circuit shown in FIG. 15.

As shown in FIG. 16, the selector 13 connects the external data bus 6 including D0 to D7 with the internal data bus 8 of IBDB0 to IBDB7 even if one of 32 bit bus-width, 16 bit bus-width, and 8 bit bus-width is selected based on selector change signals S2R, S2W.

The selector 13 transfers data read from the external memories through from external data bus of D0 to D7 to the internal data bus of IBDB0 to IBDB7 when the selector change signal S2R is asserted, and when the selector change signal S2W is asserted data read out from the MPU core section 2 is transferred through from the internal data bus of IBDB0 to IBDB7 to the external data bus of D0 to D7.

By the way, when the selector change signal including the character "R", for example S2R is asserted to the selector 13 to 16, data read out from the external memory is transferred to the MPU core section 2 through from the external data bus 6 to the internal data bus 8.

On the other hand, when the selector change signal including the character "W", for example S2W is asserted to the selector 13 to 16, data read out from the MPU core section 2 is transferred from the internal data bus 6 to the external data bus 8.

Figure 17:
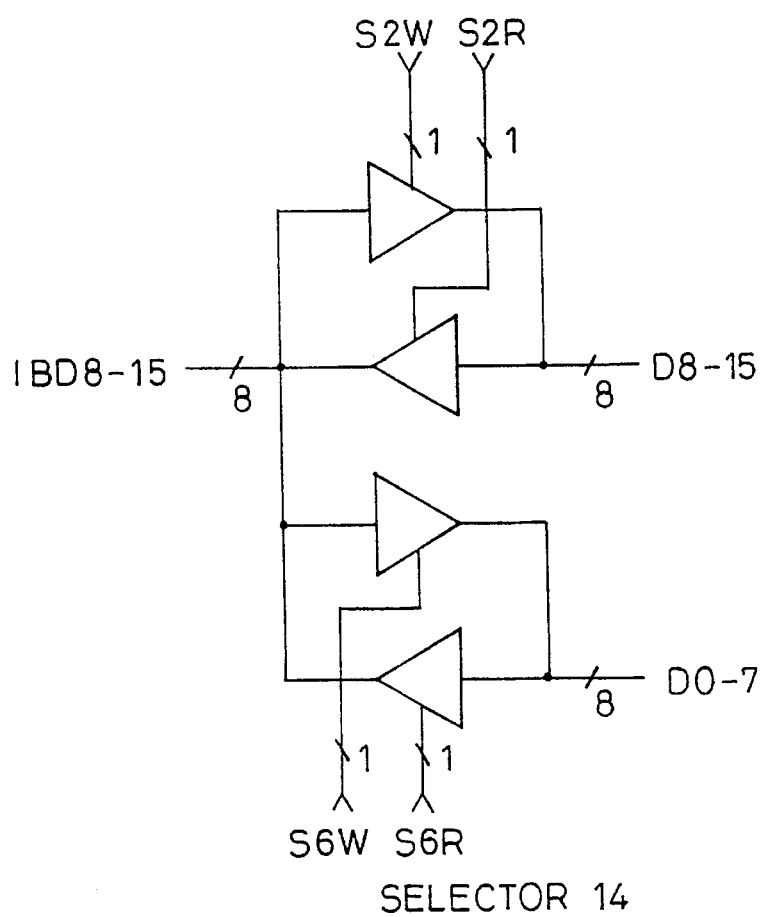
FIG. 17 is a configuration of the selector 14 in the bus change circuit shown in FIG. 15.

The selector 14, as shown in FIG. 17, connects the external data bus of D8 to D15 with the internal data bus of IBDB8 to IBDB15 when the bus-width of the external data bus 6 is selected as the 32 bit bus-width.

The selector 14 connects the external data bus of D0 to D7 with the internal data bus of IBDB8 to IBDB15 when the bus-width of the external data bus 6 is selected as the 8 bit bus-width.

Figure 18:
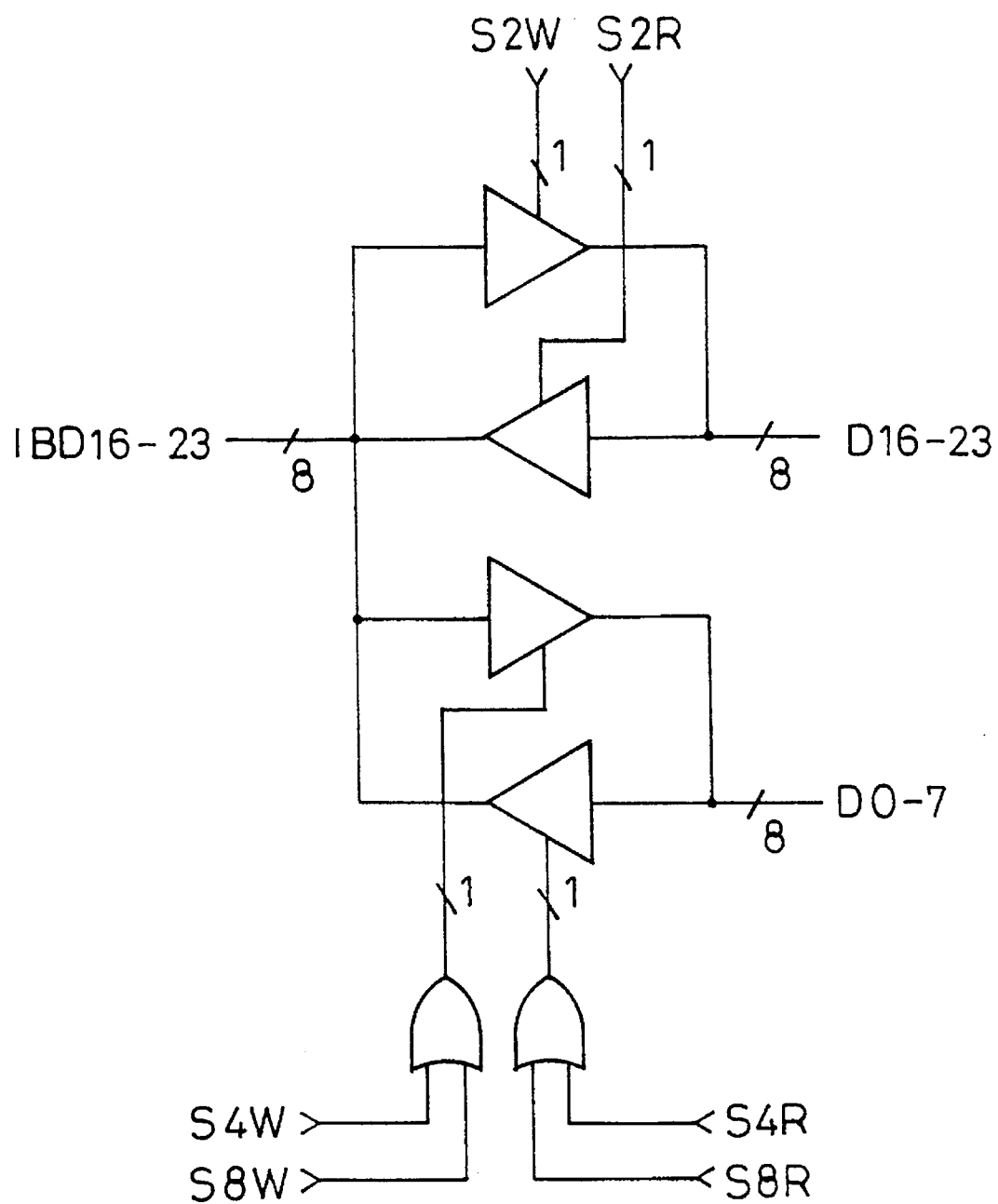
FIG. 18 is a configuration of the selector 15 in the bus change circuit shown in FIG. 15.

The selector 15, as shown in FIG. 18, connects the external data bus of D16 to D23 with the internal data bus of IBDB16 to IBDB23 when the bus-width of the external data bus 6 is selected as the 32 bit bus-width. The selector 15 connects the external data bus of D0 to D7 with the internal data bus of IBDB16 to IBDB23 when the bus-width of the external data bus 6 is selected as the 16 bit or 8 bit bus-width.

Figure 19:
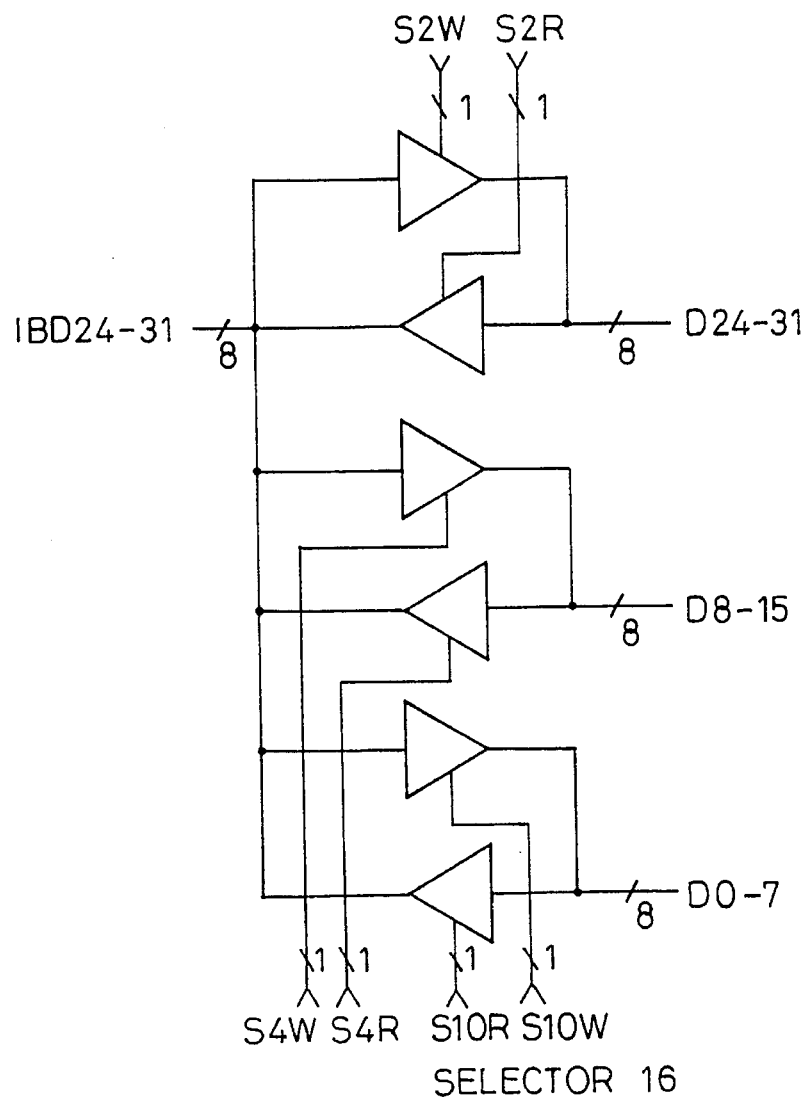
FIG. 19 is a configuration of the selector 16 in the bus change circuit shown in FIG. 15.

The selector 16, as shown in FIG. 19, connects the external data bus of D24 to D31 with the internal data bus of IBDB24 to IBDB31 in the buffer transfer state when the bus-width of the external data bus 6 is selected as the 32 bit bus-width. The selector 16 connects the external data bus of D8 to D15 with the internal data bus of IBDB24 to IBDB31 when the bus-width of the external data bus 6 is selected as the 16 bit bus-width. further, the selector 16 connects the external data bus of D0 to D8 with the internal data bus of IBDB24 to IBDB31 when the bus-width of the external data bus 6 is selected as the bit bus-width.

Figure 20:
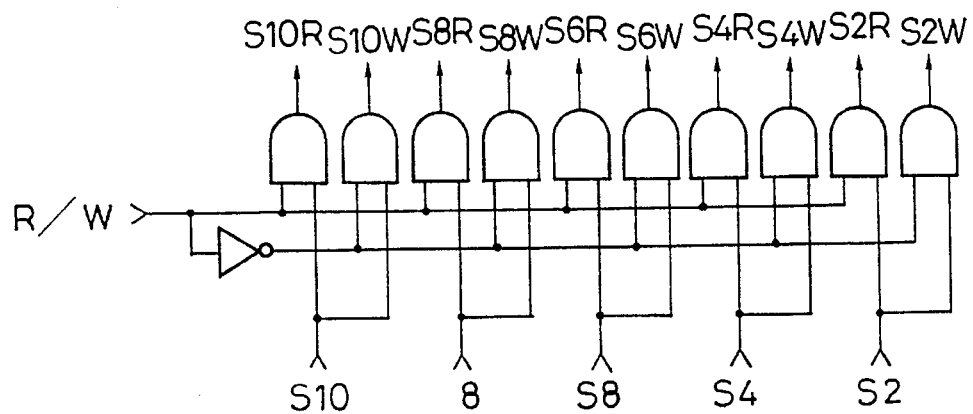
FIG. 20 is a configuration of a selector change signal generator in the bus change circuit shown in FIG. 15.

The selector change signal generator 17 generates selector change control signals S2R, S2W, S4R, S4W, S6R, S6W, S8R, S8W, S10R, and S10W for controlling the selector change operation for the selectors 13 to 16 shown in FIGS. 16 to 19. This selector change signal generator 17 is made up of the logic gates shown in FIG. 20.

Figure 21:
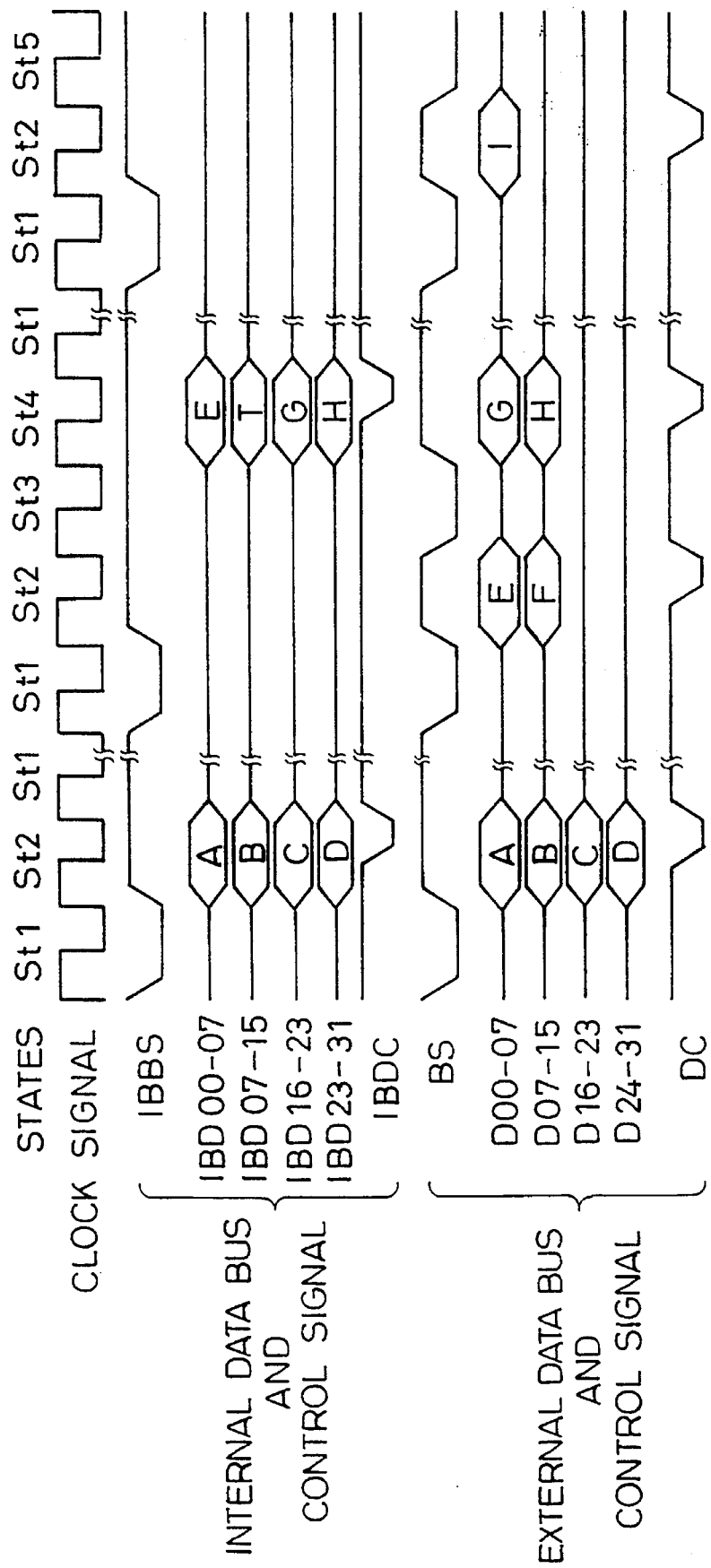
FIG. 21 is a timing chart showing a timing of a read bus operation in the microprocessor shown in FIG. 7.

FIG. 21 is a timing chart of the bus cycles of the microprocessor system having the configuration described above.

First of all, the starting of the bus cycle, the instruction fetch unit 201 or the execution unit 203 in the MPU core section 2 requires the instruction fetch operation or the data access operation, then the bus access type signal BAT is transferred from the MPU core section 2 to the bus-width indication control generator 11 in the bus state control circuit 4, the bus-width indication signals B8, B16, and B32 are generated based on the bus-width designating data stored in the control register 3.

For example, the data-width of the external data bus 6 is set as the 32 bit data-width in order to read 32 bit data of A to D from the external memory into the MPU 1, as shown in FIG. 21, the internal bus cycle and the external bus cycle for the read operation of the external data is started when the IBBS signal and the BS signal are in the low level. Then, when the state St1 transits to the state St2, data of A to D on the external data bus 6 read-out from the external memory is latched in the memory data register 9 without changing the bus-width of the external data bus 6. This data of A to D in the memory data register 9 is then transferred to the MPU core section 2 through the internal data bus 8.

Next, the data-width of the external data bus 6 is set as the 16 bit data-width in order to read 32 bit data of E to H from the external memory into the MPU 1, as shown in FIG. 21, the internal bus cycle and the external bus cycle for the read operation of the external data is started when the IBBS signal and the BS signal are in the low level. First, E and F (16 bit data) are latched in the lower order 16 bit side of the memory data register 9 through the external data bus D0 to D15 and the bus change circuit 4 in the first external bus cycle. Thereby, the first external bus cycle is completed, then in the following bus cycle, G and H (16 bit data) are latched in the higher order 16 bit side of the memory data register 9 through the external data bus D0 to D15 and the bus change circuit 4 in which the bus is changed based on the selector change control signal from the selector change control signal generator 17.

Thereby, the 32 bit data of E to H is provided to the MPU core section 2 after 4 clocks later from the starting of bus cycle.

On the other hand, the data-width of the external data bus 6 is set as the 8 bit data-width in order to read 32 bit data from the external memory into the MPU core section 2, the external data bus 6 and the internal data bus 8 are switched sequentially every 8 bit data transfer for the 32 bit data by the bus change circuit 5 in four by cycles. In this case each 8 bit data in the 32 bit data is transferred sequentially.

Thus, in the data transfer operation between the MPU 1 and the external memory in the embodiment described above according to the present invention, it is detected what kind of bus cycle which will be accessed before a bus cycle starts in accordance with a bus access type signal. Accordingly, the bus-width of the external data bus is determined before the bus cycle starts.

Thereby, when comparing with the conventional method described in the prior art section in which a bus-width is determined by an address signal with which an external memory is accessed, the method of the present invention has adequate setting-up timing for the bus-width indication signal. Accordingly, a bus cycle can be executed without operation errors in a case even if the operation frequency becomes high. Therefore the present invention can provide a microprocessor which is capable of performing at a high speed operation.

This invention is not limited to the embodiment described above. Several modifications of a microprocessor according to the present invention can be available.

For example, the field configuration of the control register 3 and the configuration of the internal circuits formed in the microprocessor 1 can be changed to another configurations. In the field configuration, R0 and R1 registers shown in FIG. 10, for the operand data access operation in the control register 3, the operand data field can be further divided into read-out operation and writing operation.

Moreover, although the initial value of the control register 3 is set by input of an external signal when the re-setting operation is performed in the embodiment described above, there is another method that fixed data values are used, for example 32 bits data for operand access and 8 bit data for instruction fetch access. Further, this fixed data values can be also changed after setting the fixed data values.

On the other hand, without incorporating of the control register 3 in the MPU 1, each of the data transfer width for instruction fetch operation and the data transfer width for operand access operation may be indicated independently by using external signals. It may be realized by indicating it from external of the MPU 1 instead of input signals R0 to R3 to the control register 3.

We will summarize the features and effects of the microprocessor according to the present invention described above, by using the present invention, a device having a special configuration for changing the bus-width of the external bus does not be required because the bus-width of external bus is changed dynamically according to the data-width of external memories.

Therefore the reduction of processing ability of a conventional microprocessor caused by inefficiently using external data bus can be prevented by the present invention.

In addition, in the present invention, before instruction fetch operation or data access operation starts the bus-width of an external data bus to be accessed is determined, so that the time for setting the bus-width of the external data bus during a bus cycle is not required. It can be caused to execute the bus cycle in adequate operation margin. Thereby it can be realized to reduce the time of the bus cycle in order to perform a high speed operation.

What is claimed is:

1. A microprocessor having a data bus-width change function for accessing instructions and data transferred to/from external device means through external bus means consisting of a plurality of buses connected to said microprocessor, said microprocessor comprising:

processor core means comprising an instruction fetch unit for fetching an instruction and an execution unit for executing an instruction, said instruction fetch unit generating a first control signal in order to fetch an instruction and transmitting said first control signal to said external device means during an instruction fetch bus cycle operation, said execution unit generating a second control signal and transferring said second control signal to said external device means during a data access bus cycle operation, internal bus means having a plurality of buses, connected to said processor core means and said external bus means, through which instructions and data are transferred to/from said processor core means;

bus-width memory means for storing first bus-width indication data indicating a bus-width of specified buses which are used in said external bus means during the instruction fetch bus cycle operation for fetching an instruction, and for storing second bus-width indication data indicating a bus-width of specified buses which are used in said external bus means during the data access bus cycle operation;

bus-width change means, connected between said internal bus means and said external bus means, for changing specified buses in said external bus means to connect specified buses in said internal bus means which are used during said instruction fetch bus cycle operation and said data access bus cycle operation; and bus-width change control means connected to said processor core means and connected between said bus-width change means and said bus-width memory means, for receiving said first control signal, said second control signal transferred from said processor core means, said first bus-width indication data and said second bus-width indication data stored in said bus-width memory means, and for generating a signal for changing a bus-width of said external bus means based on said first control signal, said second control signal, said first bus-width indication data and said second bus-width indication data in order to transfer data with a specified bus-width of said external bus means.

2. A microprocessor according to claim 1, wherein a content of said bus-width memory means is reset by said processor core means in accordance with a program.

3. A microprocessor according to claim 1, wherein a content of said bus width memory means is set with fixed data when said microprocessor is initialized.

4. A microprocessor according to claim 1, wherein a content of said bus-width memory means is set with fixed data when said microprocessor is initialized, and said bus-width memory means may be reset after initialization by said processor core means in accordance with a program.

5. A microprocessor according to claim 4, further comprising selection means for selecting said first and second bus-width indication data provided from said external device means when a resetting signal is effective and said first and second bus-width indication data transferred from said processor core means, wherein said bus-width memory means stores said first and second bus-width indication data selected by said selection means.

* * * * *